United States Patent
Matsui

(10) Patent No.: US 12,138,746 B2
(45) Date of Patent: Nov. 12, 2024

(54) PEENING APPARATUS

(71) Applicant: SUGINO MACHINE LIMITED, Uozu (JP)

(72) Inventor: Taiki Matsui, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 381 days.

(21) Appl. No.: 17/862,700

(22) Filed: Jul. 12, 2022

(65) Prior Publication Data

US 2023/0081193 A1    Mar. 16, 2023

(30) Foreign Application Priority Data

Sep. 15, 2021   (JP) .................................. 2021-150193

(51) Int. Cl.
*B24C 1/10*     (2006.01)
*B24C 7/00*     (2006.01)

(52) U.S. Cl.
CPC .............. *B24C 1/10* (2013.01); *B24C 7/0007* (2013.01)

(58) Field of Classification Search
CPC .... B24C 3/04; B24C 3/18; B24C 3/22; B24C 1/10; B24C 9/00
See application file for complete search history.

(56) References Cited

U.S. PATENT DOCUMENTS

| | | | | |
|---|---|---|---|---|
| 4,064,656 A | * | 12/1977 | Zeidler | B24C 3/04 239/165 |
| 4,947,702 A | * | 8/1990 | Kato | B25J 9/042 901/17 |
| 6,004,190 A | * | 12/1999 | Trampusch | B24C 3/325 451/87 |
| 6,368,417 B1 | * | 4/2002 | Weber | B29D 30/0662 451/36 |
| 2008/0268757 A1 | * | 10/2008 | Mase | B25J 3/02 451/340 |
| 2012/0080098 A1 | * | 4/2012 | Makiyama | B23Q 11/1046 137/154 |
| 2013/0284440 A1 | * | 10/2013 | McAfee | E21B 43/114 166/298 |

OTHER PUBLICATIONS

Soyama, H., Sanders, D., "Use of an Abrasive Water Cavitating Jet and Peening Process to Improve the Fatigue Strength of Titanium Alloy 6AI-4V Manufactured by the Electron Beam Powder Bed Melting (EBPB) Additive Manufacturing Method", JOM 71(12), pp. 4311-4318, 2019.

* cited by examiner

*Primary Examiner* — Joel D Crandall
(74) *Attorney, Agent, or Firm* — United IP Counselors, LLC

(57) ABSTRACT

The peening apparatus includes a processing tank, a table, a moving unit including a nozzle moving device, a quill, a first head having a mounting hole and disposed at a distal end of the quill, a motor and a first spindle exposed from the mounting hole, a nozzle head portion separable from the moving unit and including a second head having a connection port connected to the mounting hole, a connecting shaft connected to the first spindle, a second spindle, a nozzle disposed below the second spindle, a nozzle flow path penetrating inside the second spindle and connected to the nozzle to be opened to an upper end of the second spindle, and a swivel joint disposed at an upper end portion of the second spindle and connected to the nozzle flow path.

20 Claims, 8 Drawing Sheets

PEENING APPARATUS

CROSS-REFERENCE TO RELATED APPLICATIONS

This application claims the benefit of priority to Japanese Patent Application No. 2021-150193, filed on Sep. 15, 2021, the entire contents of which are hereby incorporated by reference.

BACKGROUND

1. Technical Field

The present invention relates to a peening apparatus.

2. Description of the Background

A method of improving the surface roughness of samples such as metallic materials produced by additive manufacturing has been proposed. (H. Soyama and D. Sanders, Use of an Abrasive Water Cavitating Jet and Peening Process to Improve the Fatigue Strength of Titanium Alloy 6Al-4V Manufactured by the Electron Beam Powder Bed Melting (EBPB) Additive Manufacturing Method, JOM 71 (12), 4311-4318 (2019), hereinafter referred to as Non-Patent Literature 1). In the method of Non-Patent Literature 1, a sample is fixed in a tank containing an abrasive and water. Then, water pressurized by a plunger pump is ejected toward the sample from a nozzle that is immersed in the tank and directed downward. This reduces the residual stress on the surface of the sample.

BRIEF SUMMARY

An object of the present invention is to provide a peening apparatus which performs a metal surface processing with easy maintenance.

A first aspect of the present invention provides a peening apparatus, including:
- a processing tank having an opening upward and configured to store abrasive particles and processing liquid, the processing tank configured to fluidize the abrasive particles by the processing liquid;
- a table disposed inside the processing tank, a workpiece configured to be placed on the table;
- a moving unit including
  - a nozzle moving device,
  - a quill disposed on the nozzle moving device,
  - a first head having a mounting hole, the first head disposed at a distal end of the quill,
  - a motor disposed at a basal end of the quill, and
  - a first spindle connected to the motor, the first spindle exposed from the mounting hole to be disposed inside the first head in a rotatable manner about a vertical axis, and
- a nozzle head portion separable from the moving unit, the nozzle head portion including
  - a second head having a connection port connected to the mounting hole, the second head disposed on the first head,
  - a connecting shaft disposed inside the second head, the connecting shaft connected to the first spindle via the connection port,
  - a second spindle connected to the connecting shaft, the second spindle disposed in a rotatable manner about the vertical axis in the second head,
  - a nozzle disposed below the second spindle,
  - a nozzle flow path passing inside the second spindle to be connected to the nozzle, the nozzle flow path having an opening at an upper end portion of the second spindle, and
  - a swivel joint disposed at an upper end portion of the second spindle to be connected to the nozzle flow path.

The quill is a slide base having a circular or rectangular cross-section.

The peening apparatus may further include a cover for suppressing scattering of the abrasive particles and the processing liquid.

The cover includes an extendable cover. The extendable covers are, for example, bellows or telescopic covers. The quill is disposed through the cover. Preferably, the motor is arranged outside the cover as seen from the processing tank.

The peening apparatus may have a propeller shaft disposed along the quill inside the quill and connected to the motor. The first bevel gear is connected to the propeller shaft. Preferably, the motor is a servo motor or a stepping motor.

The connecting shaft is arranged coaxially with the first spindle. The second spindle is arranged parallel to the connecting shaft and offset from the connecting shaft. The second spindle is disposed, for example, in the distal end direction of the connecting shaft. The drive pulley and the driven pulley are preferably toothed pulleys. The endless belt is preferably a toothed belt.

The cylinder is, for example, an air cylinder or an electric cylinder. The lifter may include a linear motion guide. The linear motion guide is, for example, a combination of the guide bush and the guide shaft. The guide shaft slides inside the guide bush. The guide bush is disposed above the processing tank. Preferably, the guide bush is arranged above the liquid level. The linear motion guide may be, for example, a ball spline or a linear guide.

When the lifter raises or lowers the table, the guide is guided by the guide rail to restrict the rotation of the table. When the table reaches the lower position, the central axis of the first shaft coincides with the central axis of the second shaft. When the table reaches the lower position, the table, the second bracket, and the first bracket are integrally rotatable.

The table turning device is a cylinder or a motor. The table turning device may include a rotary cam. The table turning shaft may penetrate a side wall of the processing tank.

The guide is, for example, a cam follower. The guide rail has, for example, a guide groove in which the cam follower rolls. The guide may be a slider that slides with the guide rail. Preferably, the guide is guided by the guide rail when the pin is disengaged from the pin hole.

The second bracket is located at the lower end of the strut. The lifter integrally raises or lowers the second housing, the driven shaft, the second bracket, and the table. The second shaft may be rotatably disposed in the second housing. The second bracket is disposed on the second shaft.

Preferably, the lower end of the guide rail is located above the liquid level of the processing tank.

Preferably, the processing tank has an overflow port at an upper portion. At this time, the liquid level of the processing liquid in the processing tank is defined by the height of the overflow port. Preferably, the processing tank has a first bend portion and a second bend portion. The first bend portion surrounds the upper end of the processing tank and extends to the inside of the processing tank. Preferably, the first bend portion surrounds the entire circumference of the processing tank. The first bend portion extends in the horizontal direction. The second bend portion is disposed at the distal end of the first bend portion and extends downwardly. Preferably, the second bend portion surrounds the entire inner circumference of the first bend portion.

The peening apparatus according to the present invention allows to perform a metal surface processing with easy maintenance.

DETAILED DESCRIPTION

First Embodiment

Figure 1:
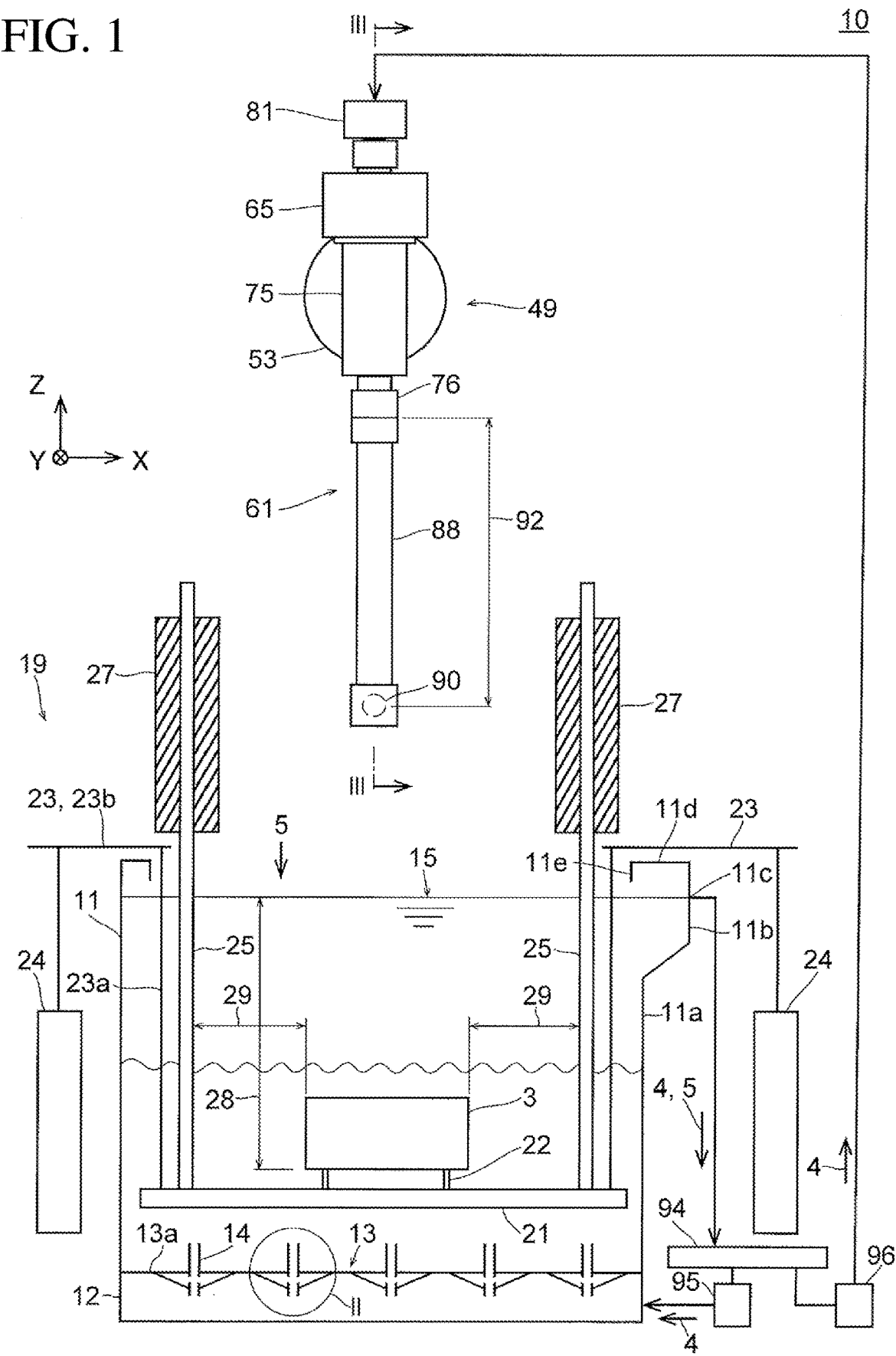
FIG. 1 is a cross-sectional view of a peening apparatus according to a first embodiment.
Figure 3:
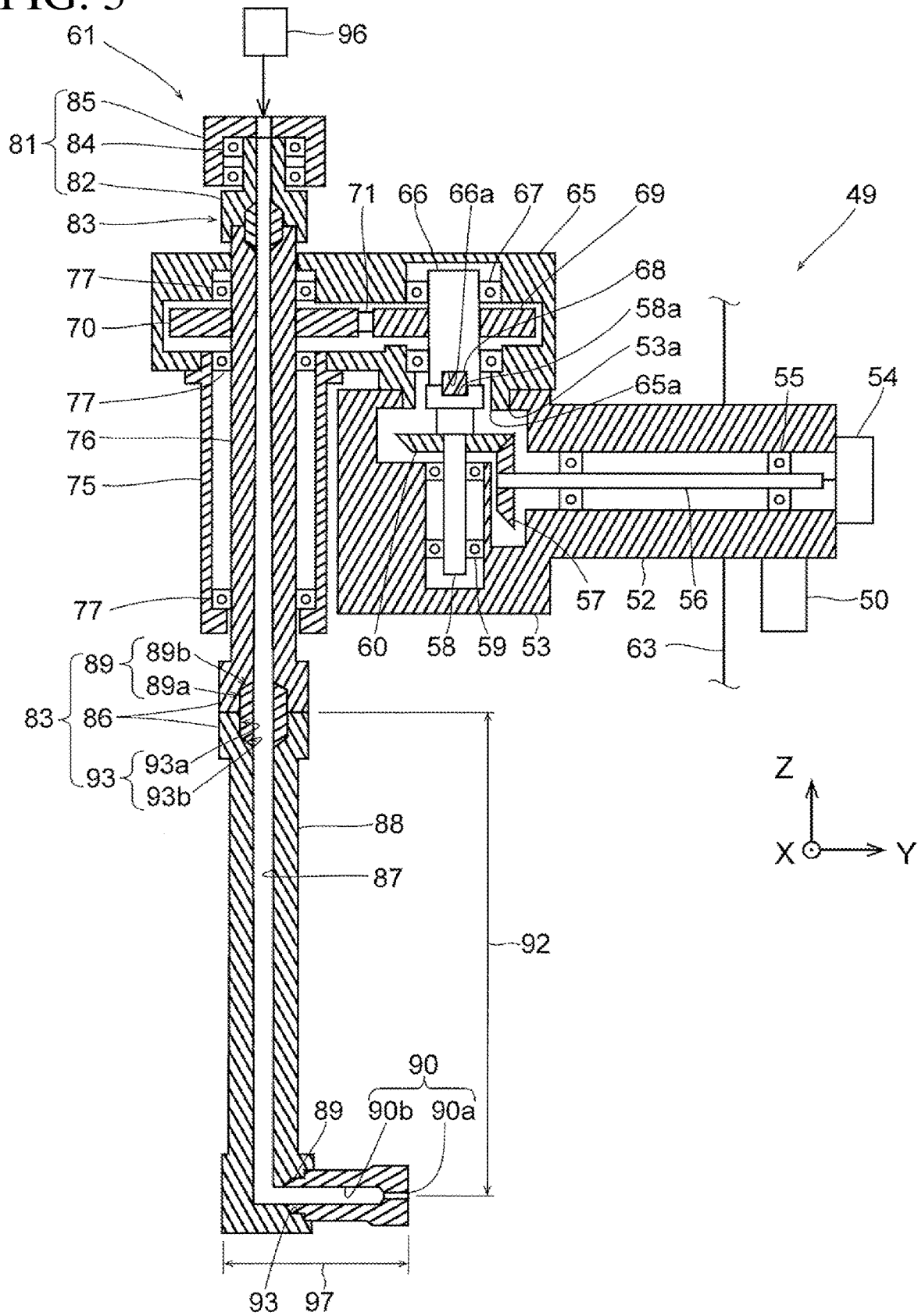
FIG. 3 is a cross-sectional view taken along III-III in FIG. 1.

As shown in FIGS. 1 and 3, a peening apparatus 10 according to the present embodiment includes a processing tank 11, a dispersion chamber 12, a flow nozzle 14, a table 21, a cover 63, a moving unit 49, and a nozzle head portion 61. The peening apparatus 10 may include a tank 94, a first pump 96, a second pump 95, and a lifter 19. FIG. 1 shows a state in which the table 21 is positioned at a lower position by the lifter 19.

The processing tank 11 includes a body portion 11a, an enlarged portion 11b, an overflow port 11c, a first bend portion 11d, and a second bend portion 11e. The body portion 11a is cylindrical and has a rectangular or circular cross-section. The enlarged portion 11b has a larger cross section than the body portion 11a. The enlarged portion 11b is disposed above the body portion 11a. In the transition region from the body portion 11a to the enlarged portion 11b, the cross section is gradually increased. The overflow port 11c is disposed in an upper portion of the enlarged portion 11b. The height of the overflow port 11c defines the height of the liquid level 15 of processing liquid 4.

The first bend portion 11d is disposed at the upper end of the processing tank 11 and surrounds the entire inner periphery of the processing tank 11. The first bend portion 11d is a flat plate disposed in a horizontal plane. The second bend portion 11e is disposed on the inner end of the first bend portion 11d and extends downward from the first bend portion 11d. The second bend portion 11e is disposed on the entire circumference of the inner periphery of the first bend portion 11d.

The dispersion chamber 12 is disposed below the processing tank 11. The dispersion chamber 12 may be disposed in a lower portion of the inside of the processing tank 11. The dispersion chamber 12 has a dispersion plate 13a on the upper surface (see FIG. 2). The dispersion plate 13a has a plurality of nozzle holes 13b. The nozzle holes 13b are arranged, for example, in a grid shape or a staggered grid shape. Each of the nozzle holes 13b has an internal thread. The flow nozzle 14 is disposed in each of the nozzle holes 13b. Preferably, a recess 13c surrounds each of the nozzle holes 13b.

Figure 2:
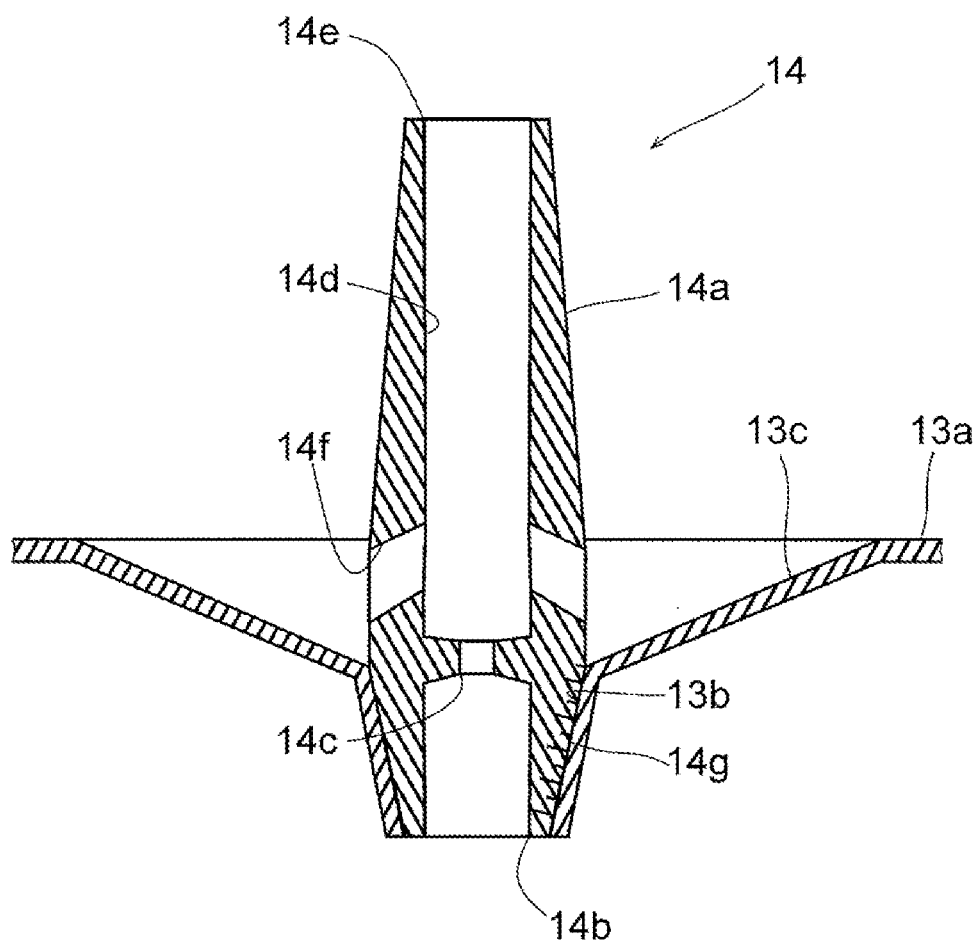
FIG. 2 is an enlarged view of part II in FIG. 1.

As shown in FIG. 2, the flow nozzle 14 includes a body 14a, an inlet 14b, a mixing chamber 14d, an inner ejection hole 14c, an outlet 14e, a plurality of particle inlets 14f, and a mounting screw 14g. FIG. 2 is a longitudinal sectional view of the flow nozzle 14 in a plane passing through the center of the body 14a and the particle inlet 14f. The body 14a, which is cylindrical, may have a slightly thinner tip portion. The mounting screw 14g is an external thread. The mounting screw 14g is screwed into the nozzle hole 13b.

The inlet 14b is disposed at the lower end of the body 14a. The outlet 14e is disposed at the upper end of the body 14a. The outlet 14e may be disposed upward. The outlet 14e may be disposed laterally or downward. The mixing chamber 14d extends vertically along the central portion of the body 14a to be connected to the outlet 14e.

The inner ejection hole 14c, which is disposed at a lower portion of the body 14a, is connected to the inlet 14b. The inner ejection hole 14c, which is disposed at the lower end portion of the mixing chamber 14d, opens toward the mixing chamber 14d. A plurality of particle inlets 14f are circumferentially evenly disposed on the side of the lower portion of the body 14a. Each particle inlet 14f passes through the body 14a in the radial direction. The particle inlet 14f is inclined upward at the radially inner side of the body 14a. The particle inlet 14f is connected from the inside of the recess 13c to the lower portion of the mixing chamber 14d.

As shown in FIG. 1, the table 21 is installed in the lower portion of the processing tank 11. The table 21 may have a pin 22. The pin 22 is installed upright from the table 21. A workpiece 3 is placed on the pin 22. A depth 28 is defined from the liquid level 15 to the lower surface of the workpiece 3.

The lifter 19 includes a lifting bracket 23, and a cylinder 24. The lifter 19 may include a guide shaft 25 and a guide bush 27. The lifting bracket 23 includes a strut 23a, and a connecting plate 23b.

The strut 23a is installed above the table 21. Preferably, the strut 23a extends above the upper end of the processing tank 11. The connecting plate 23b, which is connected to the upper end portion of the strut 23a, extends laterally to the lateral side of the processing tank 11. The cylinder 24, which is disposed on the lateral side of the processing tank 11, is connected to the connecting plate 23b. The cylinder 24 expands or contracts to raise or lower the table 21 between an upper position and a lower position. The table 21 at the upper position is located substantially the same or higher than the liquid level 15. The table 21 at the lower position is located at the bottom of the processing tank 11.

As shown in FIG. 3, the moving unit 49 includes a nozzle moving device 50, a quill 52, a motor 54, a first head 53, and a first spindle 58. The moving unit 49 may include a propeller shaft 56, a first bevel gear 57, a second bevel gear 60, and bearings 55 and 59.

The cover 63 covers the periphery of the processing tank 11. The cover 63 has a telescopic cover. As shown in FIG. 3, the quill 52 extends in a front-rear direction to penetrate the cover 63. The quill 52 is disposed on the nozzle moving device 50. As viewed from the processing tank 11, the nozzle moving device 50 is disposed outside the cover 63. The nozzle moving device 50 is, for example, a moving column. The nozzle moving device 50 freely moves the quill 52 in the lateral direction (X), the front-rear direction (Y), and the vertical direction (Z).

A motor 54 is disposed at the basal end of the quill 52. As viewed from the processing tank 11, the motor 54 is disposed outside the cover 63. The first head 53 is disposed at the distal end of the quill 52. The first head 53 is disposed inside the cover 63. The first head 53 has an upper portion having a mounting hole 53a.

The propeller shaft 56 is supported by the bearing 55 inside the quill 52. The propeller shaft 56 extends in the front-rear direction. The basal end of the propeller shaft 56 is connected to the motor 54. The first bevel gear 57 is fastened to the distal end of the propeller shaft 56 inside the first head 53.

The first spindle 58 is supported by the bearing 59 inside the first head 53. The first spindle 58 extends vertically. The second bevel gear 60, which is fastened to the first spindle 58, meshes with the first bevel gear 57. The upper end of the first spindle 58 is disposed toward the mounting hole 53a. The first spindle 58 has a first key groove 58a on the upper end surface.

The nozzle head portion 61 includes a second head 65, a connecting shaft 66, a second spindle 76, a nozzle 90, a nozzle flow path 87, and a swivel joint 81. The nozzle head portion 61 may include a key 68, a drive pulley 69, a driven pulley 70, an endless belt 71, a tubing collar joint 83, a nozzle holder 88, and bearings 67 and 77.

The second head 65 has a connection port 65a. The second head 65 is disposed above the first head 53. The second head 65 extends frontward from the first head 53. The second head 65 may include a spindle housing 75.

The connection port 65a, which is disposed at the lower portion of the second head 65, is connected to the mounting hole 53a. The connection port 65a may be fitted into and inserted into the mounting hole 53a. Preferably, the second head 65 is positioned on the first head 53 by a pin or the like.

The spindle housing 75 is disposed in front of the first head 53. The spindle housing 75 extends downward from the second head 65. The lower end of the spindle housing 75 extends to substantially the same height as or further below the lower end of the first head 53.

The connecting shaft 66 is supported by bearing 67 inside the second head 65. The connecting shaft 66 is disposed coaxially with the first spindle 58. The connecting shaft 66 has a second key groove 66a at the lower end.

The key 68 is fastened to the second key groove 66a. The key 68 is received into the first key groove 58a to connect the first spindle 58 and the connecting shaft 66. The key 68 is, for example, a parallel key or a woodruff key. The key 68 may be fastened to the first key groove 58a.

The second spindle 76 passes through the second head 65 and the spindle housing 75 to be supported by the bearing 77. The second spindle 76 extends vertically. The lower end of the second spindle 76 extends at the same height as the lower end of the first head 53 or below the lower end of the first head 53.

The drive pulley 69 is fastened to the connecting shaft 66. The driven pulley 70 is fastened to the second spindle 76. The endless belt 71 is suspended between the drive pulley 69 and the driven pulley 70. The second head 65 accommodates the drive pulley 69, the driven pulley 70, the endless belt 71 and the bearings 77, 67.

A swivel joint 81 is disposed above the second spindle 76. The swivel joint 81 includes a swivel housing 85, a bearing 84, and a swivel shaft 82. The swivel shaft 82 is supported by bearing 84 inside the swivel housing 85. The swivel shaft 82 is connected to the upper end of the second spindle 76. The swivel housing 85 is restricted from rotating.

The nozzle holder 88 is disposed below the second spindle 76. The nozzle holder 88 extends vertically. The nozzle 90 is disposed at the lower end portion of the nozzle holder 88 and directed toward the horizontal direction.

The nozzle flow path 87 penetrates the nozzle holder 88 and the second spindle 76. The nozzle flow path 87 extends vertically. The nozzle flow path 87 bends at a right angle at the lower end of the nozzle holder 88 to be connected to the nozzle 90.

The swivel shaft 82, the second spindle 76, the nozzle holder 88, and the nozzle 90 are each connected by the tubing collar joint 83. The tubing collar joint 83 includes a tubing collar 89, a fastening joint 86, and a pair of collar mounting holes 93.

The tubing collar 89 has a hollow cylindrical shape with pointed ends. The tubing collar 89 has an outer cylindrical surface 89a and a conical surface 89b. The conical surfaces 89b are disposed at both ends of the outer cylindrical surface 89a. Fluid flows inside the tubing collar 89. The tubing collar 89 constitutes part of the nozzle flow path 87. The fastening joint 86 is a flange or a threaded component.

The collar mounting hole 93 has an inner cylindrical surface 93a, and an inner conical surface 93b. The collar mounting holes 93 are disposed at both ends of the two members to be connected, respectively. The inner cylindrical surface 93a is in surface contact with the outer cylindrical surface 89a. The inner conical surface 93b may have a slightly larger apex angle than the conical surface 89b.

The tubing collar 89 is inserted between the two collar mounting holes 93. When the members on both sides of the fastening joint 86 are fastened, the conical surface 89b is in surface contact with the conical surface 93b to be pressed and deformed. This seals the gap between the two members.

The tubing collar 89 may be integrally formed with one of the members.

The nozzle 90 may be integrally formed with the tubing collar 89. The nozzle 90 has an ejection port 90a and a liquid guide path 90b. Preferably, the liquid guide path 90b has a length of 5 to 8 times the inner diameter of the ejection port 90a. The liquid guide path 90b connects the nozzle flow path 87 and the ejection port 90a. The nozzle 90 is screwed into and fixed to the nozzle holder 88. The nozzle 90 is a straight spray nozzle or a flat spray nozzle. The nozzle 90 and the nozzle holder 88 has an axial length 97 smaller than the gap 29 between the workpiece 3 and the lifter 19.

Referring to FIG. 1, the tank 94 stores a processing liquid 4. The tank 94 includes a precipitation tank. The tank 94 separates abrasive particles 5 from the processing liquid 4 returned from the processing tank 11.

The pump 95 is, for example, a volute pump or a diaphragm pump. The pump 95 feeds the processing liquid 4 into the dispersion chamber 12. The discharge pressure of the pump 95 is, for example, 0.3 to 0.7 MPa.

The processing liquid 4 is ejected from the flow nozzle 14. Referring to FIG. 2, the processing liquid 4 is ejected into the mixing chamber 14d from the internal ejection hole 14c. The pressure around the inner ejection hole 14c drops, and the processing liquid 4 at the bottom of the processing tank 11 is sucked from the particle inlet 14f. At this time, the abrasive particles 5 floating inside or around the recess 13c by the flow of the processing liquid 4 flow into the mixing chamber 14d from the particle inlet 14f. The processing liquid 4 and the abrasive particles 5 flowing into the particle inlet 14f are mixed with the jet of the processing liquid 4 ejected from the inner ejection hole 14c and discharged from the outlet 14e. The abrasive particles 5 are stirred and fluidized by the processing liquid 4. The abrasive particles 5 float at the bottom of the processing tank 11. The processing liquid 4 rises in the processing tank 11, is discharged from the overflow port 11c, and returns to the tank 94.

The pump 96 is a piston pump. The pump 96 is connected to the swivel housing 85. The pump 96 feeds the processing liquid 4 to the nozzle 90 via the swivel joint 81 and the nozzle flow path 87. The discharge pressure of the pump 96 is, for example, a 100 MPa~245 MPa. The processing liquid 4 is ejected from the nozzle 90 into the processing tank 11. The processing liquid 4 ejected from the nozzle 90 generates cavitation in the processing tank 11. The generated cavity moves by the jet of the processing liquid 4 and collides with the workpiece 3. The cavity crushes the surface of the workpiece 3 to generate residual stress. Further, the jet of the processing liquid 4 entrains the abrasive particles 5 floating at the bottom of the processing tank 11 to impinge on the surface of the workpiece 3. The abrasive particles 5 grind the surface of the workpiece 3.

Figure 4:
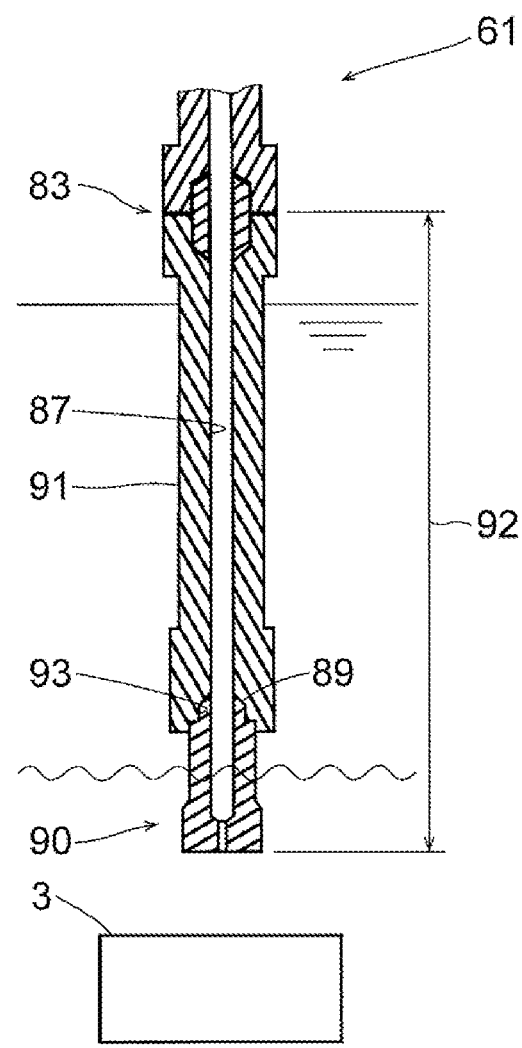
FIG. 4 shows a modification of a nozzle block according to the first embodiment.

The nozzle head portion 61 may include a nozzle holder 91 as shown in FIG. 4. The nozzle 90 is downwardly mountable to the nozzle holder 91 on the extension line of the second spindle 76. Other configurations of the nozzle holder 91 are substantially identical to the nozzle holder 88. The nozzle holder 91 can be replaced with the nozzle holder 88.

The second head 65 of the present embodiment is detachable from the first head 53. The moving unit 49 is thus separable from the nozzle head portion 61. The nozzle head portion 61 is easy to wear as exposed to the processing liquid 4 with high pressure, the abrasive particles 5, and the jet of the processing liquid 4. Separating the nozzle head portion 61 from the moving unit 49 allows to easily maintain the consumable nozzle head portion 61.

The second head 65 is disposed above the first head 53. Thus, there is no member that hinders the periphery of the nozzle holder 88 or the nozzle 90 below the first head 53. This ensures the moving range of the nozzle 90 widely. As the connecting portion between the second head 65 and the first head 53 is located upward, the connecting portion is suppressed from being damaged by the processing liquid 4 or the abrasive particles 5.

The second spindle 76 is offset from the connecting shaft 66 by a belt mechanism (the drive pulley 69, the driven pulley 70, and the endless belt 71). The second spindle 76 is thus disposed in front or lateral side of the first head 53. Further, as compared with the configuration of directly connecting the second spindle 76 below the first spindle 58, the lower end of the second spindle 76 can be disposed upward. The lower end of the second spindle 76 is substantially below the lower end of the first head 53. Thus, even when the nozzle moving device 50 lowers the second spindle 76 to the vicinity of the liquid level 15, the first head 53 is positioned above the liquid level 15. This suppresses the moving unit 49 from being damaged by the processing liquid 4 or the abrasive particles 5.

The first spindle 58 is exposed from the mounting hole 53a. Thus, when the second head 65 is removed from the first head 53, the key 68 and the first key groove 58a are exposed from the mounting hole 53a. This allows the operator to measure the parallelism between the key 68 or the first key groove 58a (first spindle 58) and the nozzle moving device 50, or the parallelism between the key 68 or the first key groove 58a (first spindle 58) and the table 21. Further, the operator measures and adjusts the backlash between the first bevel gear 57 and the second bevel gear 60.

A length 92 from the upper end of the nozzle holder 88 to the nozzle 90 is longer than the depth 28 from the liquid level 15 of the processing tank 11 to the lower end of the workpiece 3 when the table 21 is at the lower position. This prevents the connection portion (the tubing collar joint 83) between the nozzle holder 88 and the second spindle 76 from being immersed in the processing liquid 4 when the nozzle 90 is immersed in the processing tank 11 and directed toward the workpiece 3. This suppresses the second spindle 76 and the tubing collar joint 83 from being worn or damaged by the jet of the processing liquid 4 or the abrasive particles 5.

The lifter 19 raises the table 21 to the vicinity of the liquid level 15 of the processing tank 11. This allows the operator to detachably attach the workpiece 3 to the table 21 above the liquid level 15. The operator can detachably attach the workpiece 3 to the table 21 without discharging the processing liquid 4 and the abrasive particles 5 in the processing tank 11.

The nozzle 90 ejects the processing liquid 4 with being immersed in the processing liquid 4 stored in the processing tank 11. The liquid level 15 is disturbed by the ejection of the processing liquid 4 from the nozzle 90. However, the first bend portion 11d and the second bend portion 11e disposed at the upper end portion of the processing tank 11 can suppress the overflow of the processing liquid 4 from the processing tank 11.

The guide bush 27 is disposed above the liquid level 15. The abrasive particles 5 are thus hardly clogged inside the guide bush 27. The cylinder 24 is disposed outside the processing tank 11. This suppress the cylinder 24 from being damaged by the processing liquid 4 or the abrasive particles 5.

Second Embodiment

Figure 5:
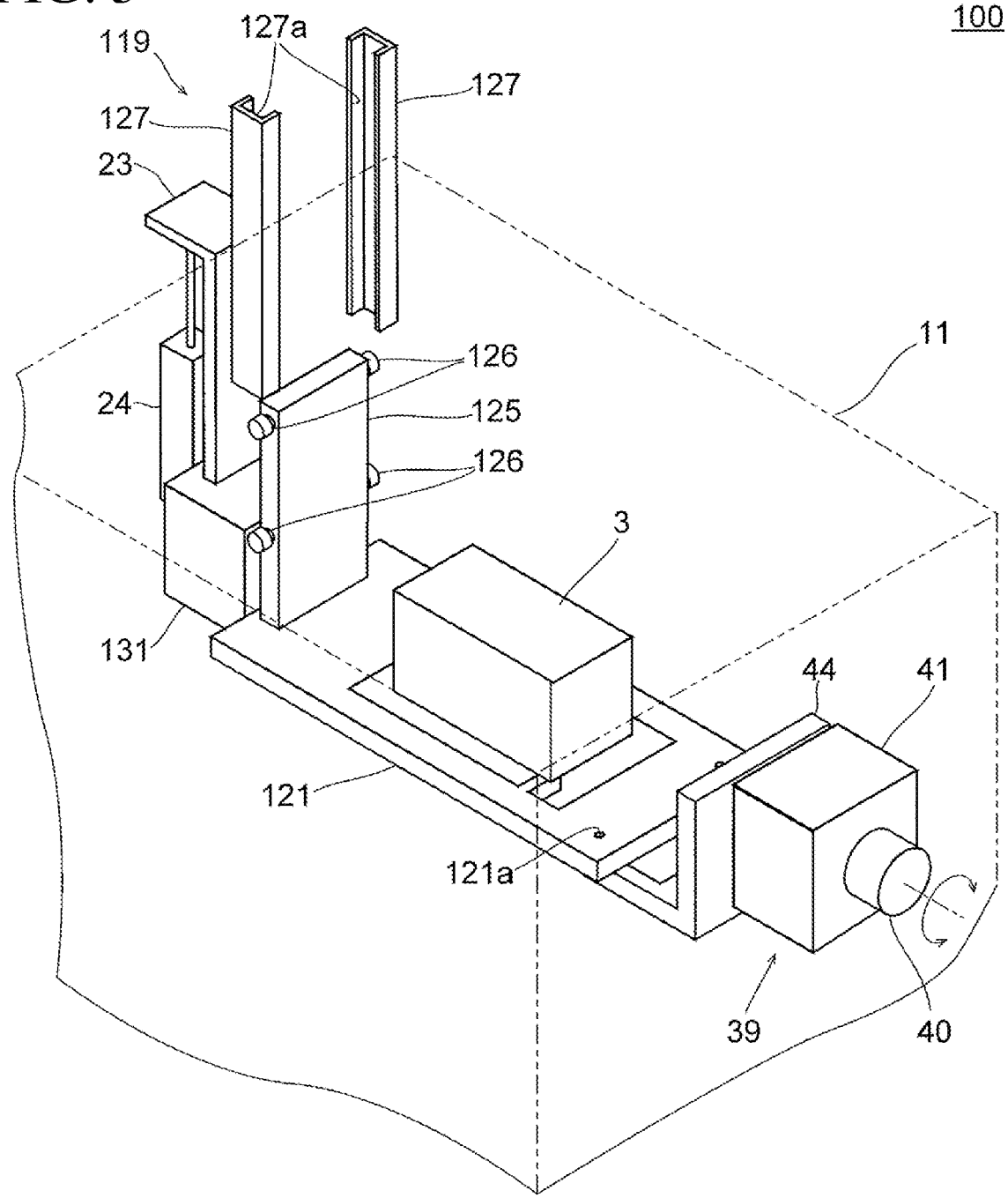
FIG. 5 is a perspective view of a peening apparatus according to a second embodiment.
Figure 6:
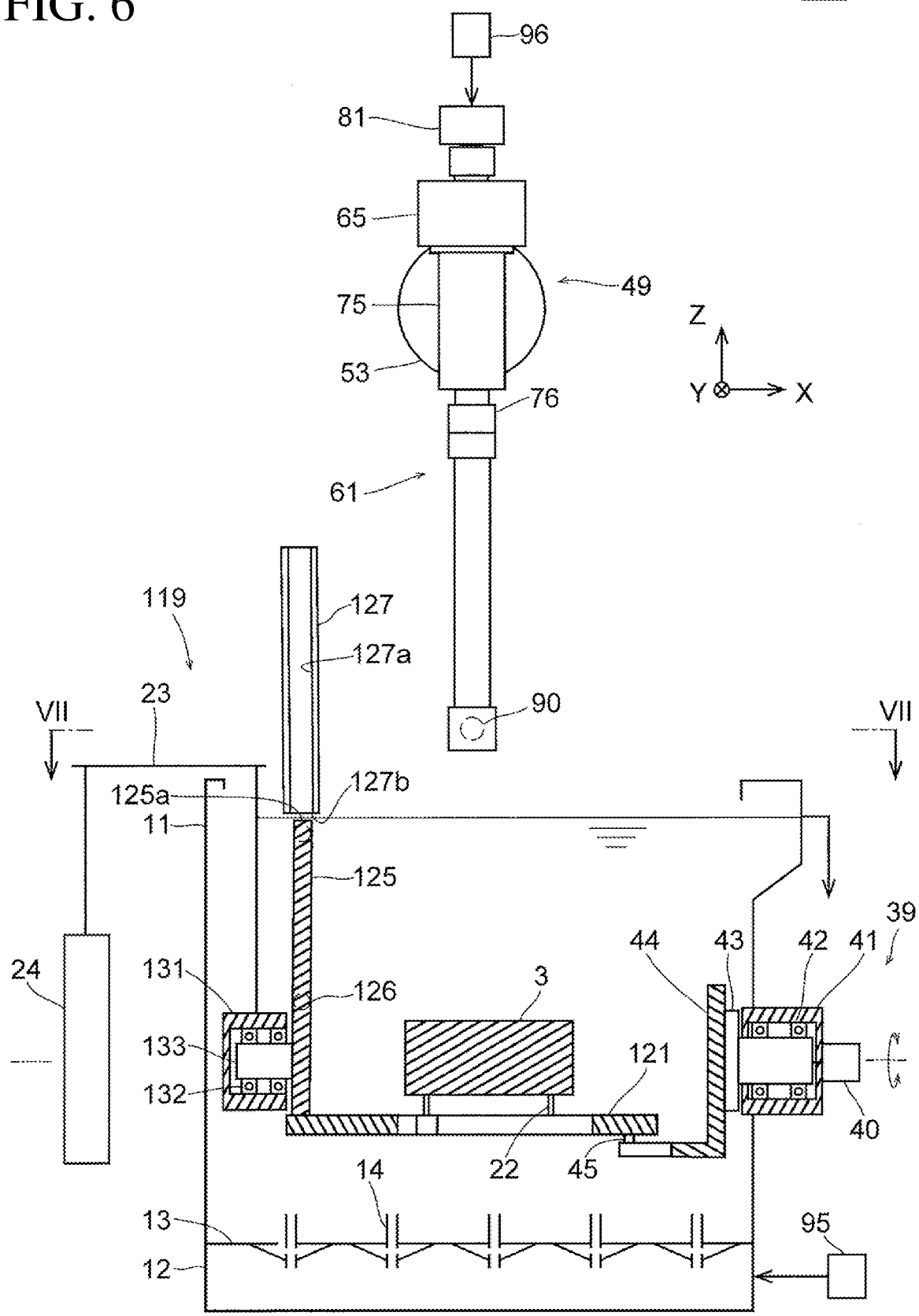
FIG. 6 is a cross-sectional view of the peening apparatus according to the second embodiment.
Figure 7:
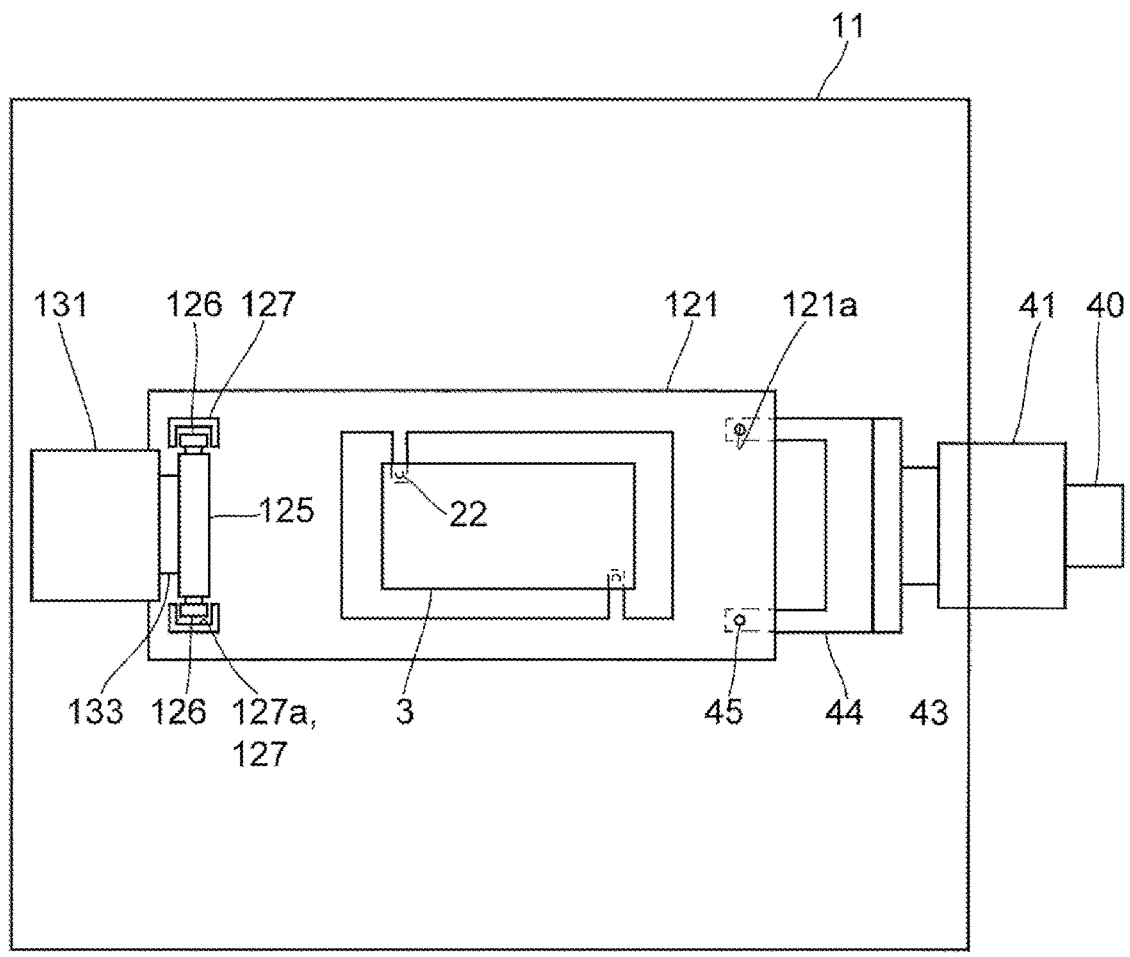
FIG. 7 is a cross-sectional view taken along VII-VII in FIG. 6.
Figure 8:
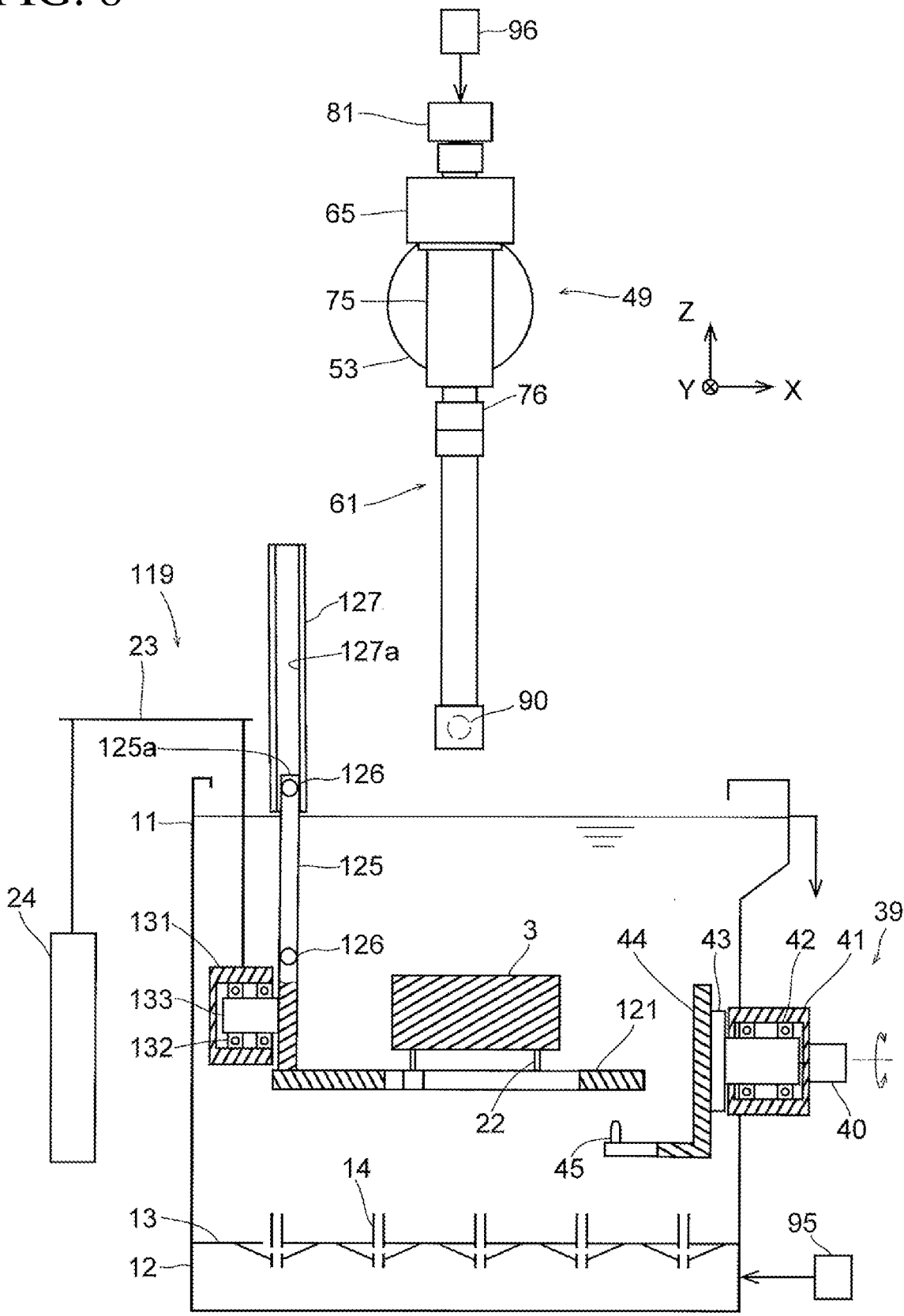
FIG. 8 is a cross-sectional view of the peening apparatus according to the second embodiment.

As shown in FIGS. 5 to 8, the peening apparatus 100 according to the present embodiment includes a rotary table 39, a single lifter 119, and a table 121. FIGS. 6 and 8 are cross-sectional views of the peening apparatus 100 passing through a table turning axis and cut in a plane parallel to the front. Other configurations of the peening apparatus 100 according to the present embodiment are substantially the same as the peening apparatus 10 of the first embodiment. FIGS. 5 and 6 show a state in which the table 121 is positioned at the lower position by the lifter 119. FIG. 8 shows a state in which the table 121 is positioned in the middle of the lower position and the upper position.

The rotary table 39 includes a first housing 41, a motor (a table turning device) 40, a first shaft 43, a bearing 42, a first bracket 44, and a pin 45. The first housing 41 is disposed on a right side surface (a first side surface) of the processing tank 11. The first housing 41 is hollow cylindrical. The first shaft 43 is supported by the bearing 42 inside the first housing 41. The motor 40 is fixed to the first housing 41 outside the processing tank 11. The output shaft of the motor 40 is connected to the first shaft 43. The first bracket 44 is an L-shape in the front view. The vertical surface of the first bracket 44 is fastened to the first shaft 43. The pin 45 is erected on the horizontal surface of the first bracket 44. Preferably, two pins 45 are arranged on the horizontal plane of the first bracket 44.

The lifter 119 is disposed on a left side surface (a second side surface). The lifter 119 includes a cylinder 24, a lifting bracket 23, a second housing 131, a second shaft 133, a bearing 132, a second bracket 125, a cam follower (guide) 126, and a pair of guide rails 127.

The second housing 131, which is a hollow block, is installed on the left side of the inside of the processing tank 11. The second housing 131 is connected below the lifting bracket 23. The second shaft 133 is supported by bearings 132 inside the second housing 131. The second bracket 125, which is a rectangular parallelepiped shape, is disposed at the left end of the table 121. The pair of cam followers 126 are disposed at the front and rear ends of the second bracket 125. The cam follower 126 rotates about the front-rear direction. Preferably, a plurality of sets of cam followers 126 are arranged side by side in the vertical direction.

The guide rail 127 includes a guide groove 127a. The guide rail 127 is C-shaped in a plan view. The guide rail 127 extends vertically above the processing tank 11. As shown in FIGS. 5 and 7, as viewed from above, each guide groove 127a faces the center axis of the second shaft 133 and coincides with the center of the cam follower 126. When the lifter 119 raises the table 121, the cam follower 126 rolls on the guide groove 127a, and the second bracket 125 is thus guided by the guide rail 127.

As shown in FIGS. 5 and 7, the table 121 has a pin hole 121a. The pin hole 121a is located at the right end of the table 121. The pin hole 121a receives the pin 45. Preferably, when the table 121 is raised by the cylinder 24 and the cam follower 126 is about to be received in the guide groove 127a, the pin hole 121a still receives the pin 45.

When the motor 40 keeps the first bracket 44 in the initial position (horizontal in FIG. 6), the lifter 119 moves up and down the table 121. At this time, the cam follower 126 is guided by the guide groove 127a to restrict the rotation of the second bracket 125 and the table 121. The table 121 is thus moved up and down while maintaining a substantially horizontal posture, as shown in FIG. 8.

When the lifter 119 lowers the table 121, and the table 121 reaches the vicinity of the lower position, the pin 45 is received into the pin hole 121a. Next, the cam follower 126 is disengaged from the guide groove 127a. When the table 121 reaches the lower position, the central axis of the first shaft 43 coincides with the central axis of the second shaft 133. Further, the table 121 is connected to the first bracket 44 via the pin 45. The first bracket 44, the table 121, and the second bracket 125 are thus turned integrally. The motor 40 freely rotates the table 121.

The motor 40 according to the present embodiment is disposed outside the processing tank 11. The motor 40 is thus prevented from being damaged by the processing liquid 4 or the abrasive particles 5. Further, the guide rail 127 is located above the liquid level 15. This prevents the guide rail 127 from being damaged by the processing liquid 4 or the abrasive particles 5.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST 10, 100 Peening apparatus
11 Processing tank
21, 121 Table
49 Moving unit
50 Nozzle moving device
52 Quill
53 First head
54 First motor
58 First spindle
61 Nozzle head portion
65 Second head
66 Connecting shaft
76 Second spindle
81 Swivel joint
87 Nozzle flow path
90 Nozzle

What is claimed is:

1. A peening apparatus, comprising:
a processing tank having an opening upward and configured to store abrasive particles and processing liquid, the processing tank configured to fluidize the abrasive particles by the processing liquid;
a table disposed inside the processing tank, a workpiece configured to be placed on the table;
a moving unit including
a nozzle moving device,
a quill disposed on the nozzle moving device,
a first head having a mounting hole, the first head disposed at a distal end of the quill,
a motor disposed at a basal end of the quill, and
a first spindle connected to the motor, the first spindle exposed from the mounting hole to be disposed inside the first head in a rotatable manner about a vertical axis, and
a nozzle head portion separable from the moving unit, the nozzle head portion including
a second head having a connection port connected to the mounting hole, the second head disposed on the first head,
a connecting shaft disposed inside the second head, the connecting shaft connected to the first spindle via the connection port,
a second spindle connected to the connecting shaft, the second spindle disposed in a rotatable manner about the vertical axis in the second head,
a nozzle disposed below the second spindle,
a nozzle flow path passing inside the second spindle to be connected to the nozzle, the nozzle flow path having an opening at an upper end portion of the second spindle, and
a swivel joint disposed at an upper end portion of the second spindle to be connected to the nozzle flow path.

2. The peening apparatus according to claim 1, further comprising:
a first bevel gear disposed in the first head to be connected to the motor; and
a second bevel gear disposed on the first spindle to mesh with the first bevel gear.

3. The peening apparatus according to claim 2, wherein the mounting hole is located in an upper portion of the first head, and
the second head is connected above the first head.

4. The peening apparatus according to claim 2, wherein the second head contains
a drive pulley disposed to the connecting shaft,
a driven pulley disposed to the second spindle, and
an endless belt suspended between the drive pulley and the driven pulley.

5. The peening apparatus according to claim 2, wherein the first spindle has, at a distal end, a first key groove extending horizontally,
the connecting shaft has, at a basal end, a second key groove extending horizontally, and the peening apparatus further comprises a key disposed between the first key groove and the second key groove to transmit rotation from the first spindle to the connecting shaft.

6. The peening apparatus according to claim 2, further comprising:
a nozzle holder below the second spindle, the nozzle holder extending along the second spindle,
wherein the nozzle is connected at a lower end of the nozzle holder, and
a length from an upper end of the nozzle holder to the nozzle is longer than a depth from a liquid level of the processing tank to a lower surface of the workpiece.

7. The peening apparatus according to claim 1, wherein the mounting hole is located in an upper portion of the first head, and
the second head is connected above the first head.

8. The peening apparatus according to claim 7, wherein the second head contains
a drive pulley disposed to the connecting shaft,
a driven pulley disposed to the second spindle, and
an endless belt suspended between the drive pulley and the driven pulley.

9. The peening apparatus according to claim 7, wherein the first spindle has, at a distal end, a first key groove extending horizontally,
the connecting shaft has, at a basal end, a second key groove extending horizontally, and
the peening apparatus further comprises a key disposed between the first key groove and the second key groove to transmit rotation from the first spindle to the connecting shaft.

10. The peening apparatus according to claim 1, wherein the second head contains
a drive pulley disposed to the connecting shaft,
a driven pulley disposed to the second spindle, and
an endless belt suspended between the drive pulley and the driven pulley.

11. The peening apparatus according to claim 10, wherein the first spindle has, at a distal end, a first key groove extending horizontally,
the connecting shaft has, at a basal end, a second key groove extending horizontally, and
the peening apparatus further comprises a key disposed between the first key groove and the second key groove to transmit rotation from the first spindle to the connecting shaft.

12. The peening apparatus according to claim 1, wherein the first spindle has, at a distal end, a first key groove extending horizontally,
the connecting shaft has, at a basal end, a second key groove extending horizontally, and
the peening apparatus further comprises a key disposed between the first key groove and the second key groove to transmit rotation from the first spindle to the connecting shaft.

13. The peening apparatus according to claim 1, further comprising:
a nozzle holder below the second spindle, the nozzle holder extending along the second spindle,
wherein the nozzle is connected at a lower end of the nozzle holder, and
a length from an upper end of the nozzle holder to the nozzle is longer than a depth from a liquid level of the processing tank to a lower surface of the workpiece.

14. The peening apparatus according to claim 1, wherein the second spindle has a lower end located below a lower end of the first head.

15. The peening apparatus according to claim 1, wherein the processing tank includes
a dispersion chamber disposed in a lower portion of the processing tank, and
a plurality of flow nozzles evenly arranged above the dispersion chamber, each of the flow nozzle configured to eject the processing liquid upwardly.

16. The peening apparatus according to claim 15, wherein the dispersion chamber includes a plurality of recesses evenly arranged on an upper surface, and
each of the flow nozzle is disposed in each of the recess.

17. The peening apparatus according to claim 15, wherein the flow nozzle includes
a body,
an inlet located at a lower end of the body,
an outlet located at an upper end of the body,
a mixing chamber connected to the outlet, the mixing chamber disposed in a center portion of the body,
an inner ejection hole located in a lower portion of the body, the inner ejection hole connecting the inlet and the mixing chamber, and
a particle inlet opened to an inside of the recess, the particle inlet located in the body to penetrate a side face of the mixing chamber.

18. The peening apparatus according to claim 1, further comprising:
a lifter configured to raise or lower the table inside the processing tank between a vicinity of a liquid level of the processing liquid and a bottom of the processing tank, the lifter including
a strut extending upward from the table beyond an upper end of the processing tank,
a connecting plate disposed at an upper end of the strut, the connecting plate extending from the strut toward a lateral side of the processing tank, and
a cylinder connected to the connecting plate, the cylinder disposed in a lateral side of the processing tank.

19. The peening apparatus according to claim 18, further comprising:
a first housing disposed on a first side face of the processing tank,
a table turning shaft rotatably disposed in the first housing,
a table turning device connected to the table turning shaft, the table turning device disposed outside the processing tank,
a first bracket including a pin, the first bracket connected to the table turning shaft inside the processing tank,
a guide rail disposed above the processing tank on a second side face that is opposite to the first side face of the processing tank,
a second housing connected to the lifter, the second housing disposed inside the processing tank, and
a second bracket including a guide configured to guide the table along the guide rail, the second bracket rotatably disposed on the second housing,
wherein the table is connected to the second bracket,
the table has a pin hole located nearer to the first side face to receive the pin, when the table is lowered by the lifter to a lowermost position, the guide is separated from the guide rail for the pin to be received in the pin hole and the table is turned by the table turning device integrally with the first bracket, and the guide is guided by the guide rail to be raised by the lifter.

20. The peening apparatus according to claim 19, wherein when the lifter lowers the table to a lower position, a lower end of the guide rail is located above an upper end of the second bracket, and when the lifter raises the table from the lower position, the guide is guided by the guide rail.

\* \* \* \* \*